(12) United States Patent
Fox et al.

(10) Patent No.: US 11,395,174 B2
(45) Date of Patent: Jul. 19, 2022

(54) SYSTEMS AND METHODS FOR OPTIMIZED LTE PRIVATE NETWORKS

(71) Applicant: ANTERIX INC., Woodland Park, NJ (US)

(72) Inventors: Michael Walter Fox, Poway, CA (US); Mark Everett Fehrenbach, San Diego, CA (US); Larry Stuart Greenstein, San Diego, CA (US); Richard Edward Rohmann, San Diego, CA (US)

(73) Assignee: ANTERIX INC., Woodland Park, NJ (US)

(*) Notice: Subject to any disclaimer, the term of this patent is extended or adjusted under 35 U.S.C. 154(b) by 27 days.

(21) Appl. No.: 16/657,864

(22) Filed: Oct. 18, 2019

(65) Prior Publication Data

US 2020/0128426 A1 Apr. 23, 2020

Related U.S. Application Data

(60) Provisional application No. 62/748,205, filed on Oct. 19, 2018.

(51) Int. Cl.
*H04L 12/865* (2013.01)
*H04W 28/02* (2009.01)
*H04L 47/2441* (2022.01)
*H04W 24/02* (2009.01)
*H04L 47/2475* (2022.01)
*H04L 47/32* (2022.01)

(52) U.S. Cl.
CPC ..... *H04W 28/0215* (2013.01); *H04L 47/2441* (2013.01); *H04L 47/2475* (2013.01); *H04L 47/32* (2013.01); *H04W 24/02* (2013.01)

(58) Field of Classification Search
CPC ....... H04L 45/22; H04L 45/24; H04L 47/125; H04L 47/19; H04L 47/2441; H04L 47/2475; H04L 47/2483; H04L 47/32; H04W 24/02; H04W 28/0215
See application file for complete search history.

(56) References Cited

U.S. PATENT DOCUMENTS

| | | | |
|---|---|---|---|
| 7,889,646 B2 * | 2/2011 | Wright | H04L 47/724 370/230 |
| 10,855,813 B1 * | 12/2020 | Moriarty | H04L 43/0811 |
| 2015/0276825 A1 * | 10/2015 | Curt | G06F 11/3058 702/58 |
| 2017/0331780 A1 * | 11/2017 | Reddy | H04L 61/1511 |
| 2018/0115494 A1 * | 4/2018 | Bhatia | H04L 47/626 |
| 2018/0351811 A1 * | 12/2018 | Taheri | H04L 47/31 |
| 2019/0158415 A1 * | 5/2019 | Pan | H04L 47/6255 |

* cited by examiner

*Primary Examiner* — Phuc H Tran
(74) *Attorney, Agent, or Firm* — Procopio, Cory, Hargreaves & Savitch LLP

(57) ABSTRACT

A network optimization platform, comprising: storage configured to store QoS and latency requirement for a plurality of applications, protocols associated with various data traffic generated by the plurality of applications; a processor configured to execute communication applications, the communication applications configured to cause the processor to: receive data traffic from the plurality of applications, classify the data traffic based on at least one of the QoS and latency requirement associated with the plurality of applications, determine a priority for packets comprising the data traffic, select a bearer for the packets based on the classification and priority, and deliver the packets to the bearer selected therefore.

10 Claims, 10 Drawing Sheets

502

SYSTEMS AND METHODS FOR OPTIMIZED LTE PRIVATE NETWORKS

CROSS-REFERENCE TO RELATED APPLICATIONS

This application claims priority to U.S. Provisional Application No. 62/748,205, filed Oct. 19, 2018, the disclosure of which is incorporated by reference herein in its entirety.

BACKGROUND

Field of the Invention

The embodiments described below are directed to systems and methods for optimizing private networks, and more specifically to systems and methods for introducing processes for additional services to a Long-Term Evolution (LTE) network as well as providing edge traffic control and Lifecycle Service Orchestration (LSO).

Related Art

A conventional networking approach used by, e.g., Investor Owned Utilities (IOUs) and Municipal Electric Utility (MEUs) involves dedicated fiber, leased T1s, point-to-point microwave, and wideband radio networks. Transforming the existing backhaul network from a dedicated point-to-point model to the shared resource model of, e.g., LTE presents certain challenges. These challenges include the following: necessity to configure network coverage with sufficient backhaul capacity, configure traffic with correct priority, and correctly model anticipated traffic and latency requirements prior to deploying applications that may impact other utility services using the network. Additionally, the costs of adding new service to use the network requires traffic engineering, and possibly reconfiguration of the network with the additional eNB sites for more capacity, new APNs, LTE bearers, and configuration of edge devices such as routers so that the new application traffic is routed with the correct transport priority and bandwidth attributes within a secure Virtual Private Network (VPN).

Part of the problem with conventional utility communications infrastructure is that such infrastructure is typically a collection of solutions that address a variety of needs using disparate transmission networks. FIG. 2 is a diagram illustrating a conventional utility communications infrastructure.

In FIG. 2, IP traffic 202 is transported on top of these disparate transmission networks 204 shown in the smaller oval below. Each site 206a-m has a dedicated network connection with an assured level of transmission performance. The traffic prioritization over the overall transmission network 200 is performed by the Type of Service (ToS) field in the IP packet header of packets being sent of the network 200. The ToS field is often configured per application in the IP network equipment by the IT department of the, e.g., utility.

There are many types of data sent in a network 200 such as that illustrated in FIG. 2, and these different types of data often have different requirements. For example, phase measurement units provide a constant stream of data that is sensitive to latency and requires substantial bandwidth, while AMI (Advanced Metering Infrastructure) metering data is low bit rate and tolerant of large latency. Supervisory Control and Data Acquisition (SCADA) monitoring data is not time critical and is at a lower bit rate but the SCADA control traffic is often time-critical and of utmost priority. For example, such data can indicate a failing conductor circuit protection. Because the routing and priority decisions are performed at the IP layer, there is never a need to make any configuration changes to the transmission layer, or the field area network.

Consolidating these disparate networks 204 over private LTE looks simple on the surface as shown in FIG. 1. You simply replace the field area network transmission circuits at sites 206a-m with wireless LTE and now the multifaceted field area networks 204 are consolidated and replaced as shown in FIG. 1; however, simply doing that does not take advantage of the valuable LTE Quality of Service (QoS) and traffic management features that are core to its value.

SUMMARY

A network optimization platform, comprising: storage configured to store QoS and latency requirement for a plurality of applications, protocols associated with various data traffic generated by the plurality of applications; a processor configured to execute communication applications, the communication applications configured to cause the processor to: receive data traffic from the plurality of applications, classify the data traffic based on at least one of the QoS and latency requirement associated with the plurality of applications, determine a priority for packets comprising the data traffic, selected a bearer for the packets based on the classification and priority, and deliver the packets to the bearer selected therefore.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

LTE offers the ability to provision multiple bearers, each with different traffic handling characteristics such as priority and latency control. Provisioning multiple bearers to, e.g., a substation to take advantage of LTE's value results in essentially multiple transmission paths to the substation, whereas prior to LTE migration, there was only one transmission path. Thus, certain embodiments as disclosed herein provide for a utility communications infrastructure in which the field area networks have been consolidated and in which multiple bearers have been deployed.

Aligning LTE bearers QCI with IP ToS settings so that the traffic can be transmitted from the source and then routed within the IP network is not straight forward and requires planning, coordination, and ongoing management. Questions that must be addressed when a new application is added at a site 206a-m, include whether: a new LTE bearer required? Can the new application share a bearer that is already provisioned? Does the IT department have to contact the LTE network manager to make a provisioning change? Will the configuration change have to be made during a maintenance window because it will disrupt the network temporarily? For example, the traffic from a phase measurement unit should certainly flow over a bearer that will assure the throughput and latency requirements are met. However, low priority monitoring data should flow over an LTE bearer with lower priority and QoS metrics. While these issues can be managed manually, it costs a lot less and reduces human errors if the LTE network can be provisioned once and no configuration change is needed when a new application is added at an endpoint in the field area network.

Provisioning three or four bearers that are organized into three or four categories and using them to transport traffic simplifies LTE network provisioning while taking advantage of the valuable traffic management features LTE provides. Using more bearers results in less efficient use of the LTE spectrum because each bearer has overhead associated with it. Further, there are a limited number (8) of types of non-GBR bearers. After a few bearers are consumed, the remaining bearer types may not be a good fit with the need of an additional application. Adding two high priority bearers of the same type may help two high priority sources get traffic through with respect to lower priority bearers but this approach pits two high priority applications against one another. This does not resolve contention when one application has a critical need while the other application may be sending log files.

Figure 1:
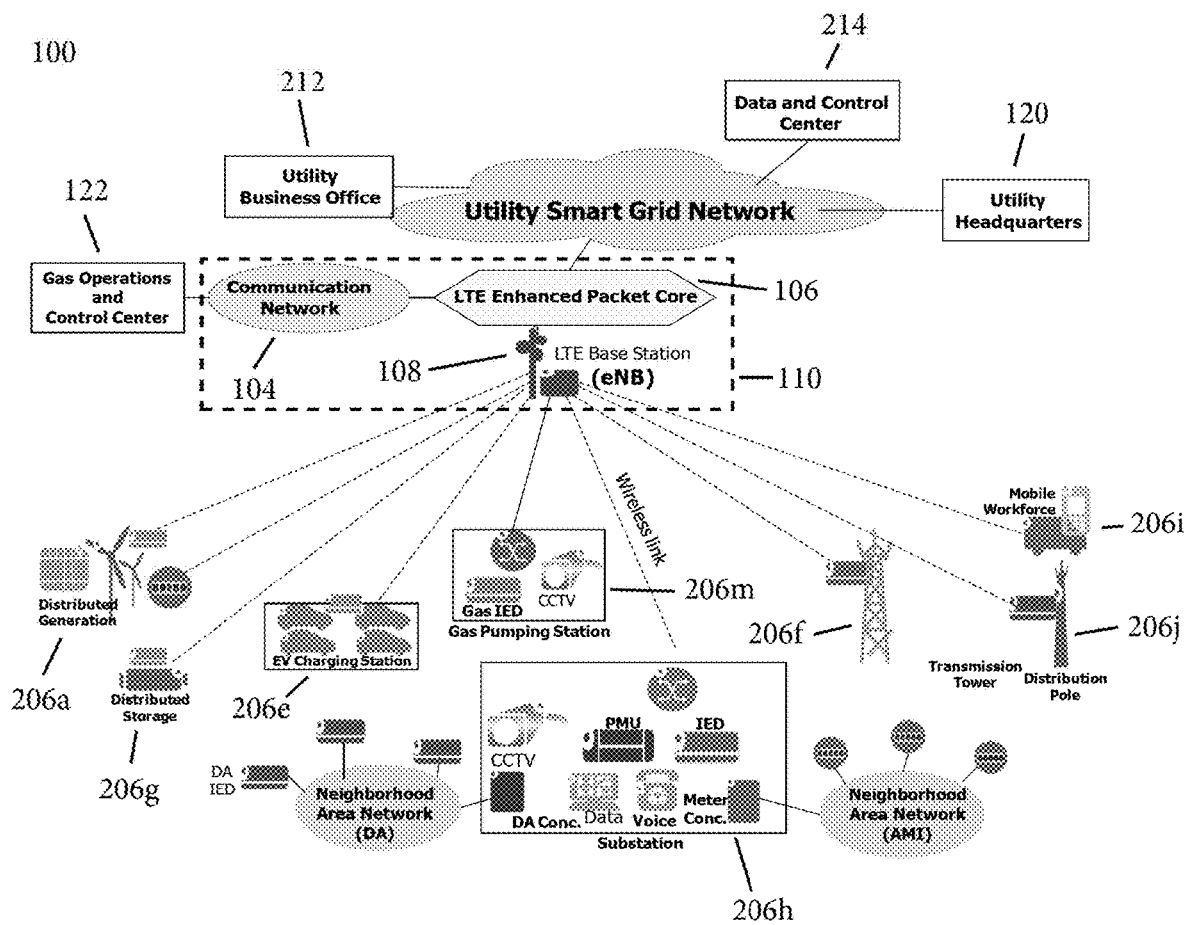
FIG. 1 is a diagram illustrating a utility communications infrastructure in which the field area networks have been consolidated.
Figure 2:
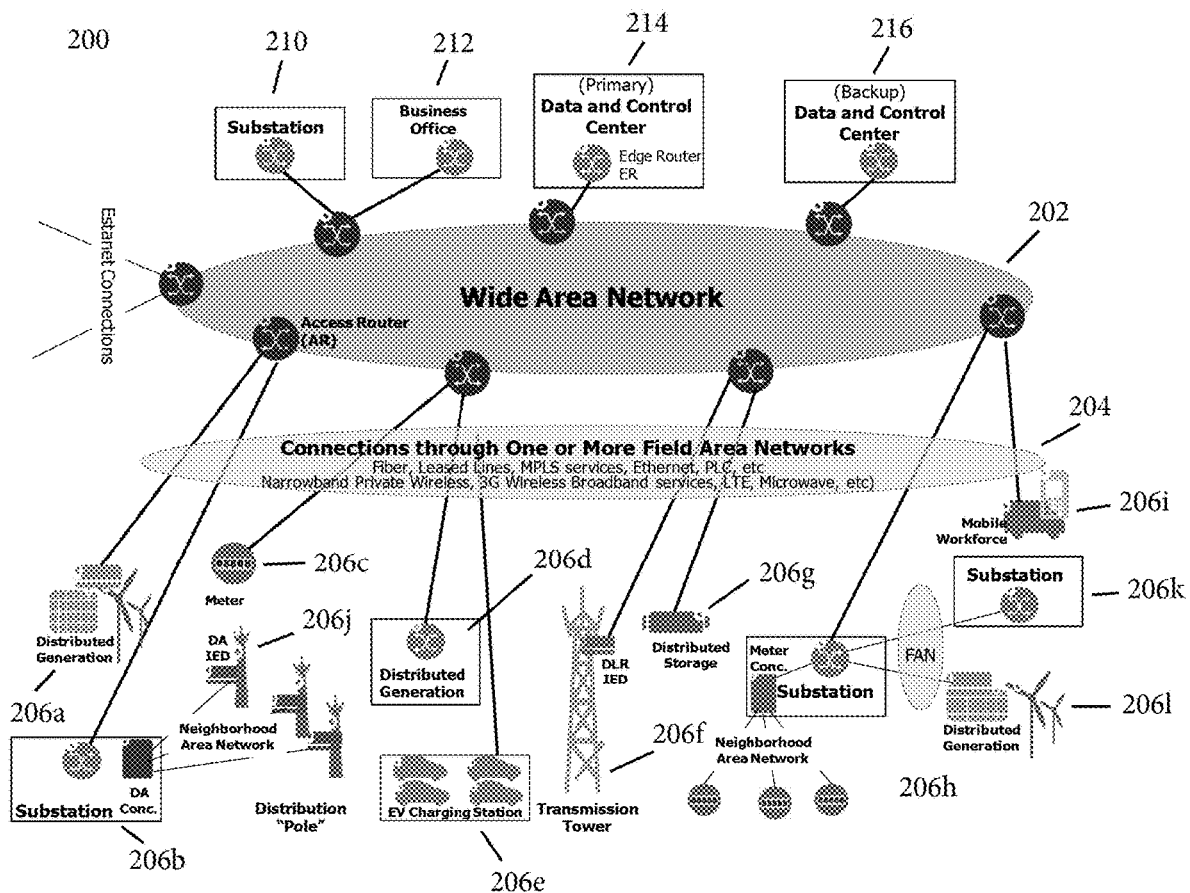
FIG. 2 is a diagram illustrating a conventional utility communications infrastructure.
Figure 3:
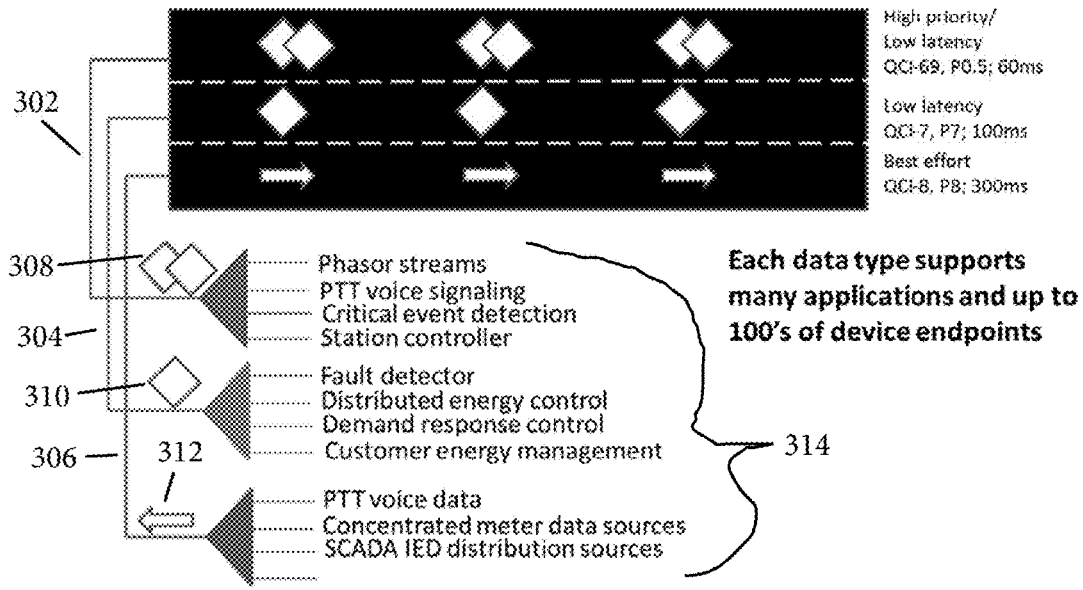
FIG. 3 is a diagram illustrating an example method for consolidating traffic on appropriate LTE bearers.

FIG. 3 is a diagram illustrating one example for consolidating traffic on appropriate bearers. As illustrated, there are three bearers 302, 304, and 306 for non-GBR (guaranteed bit rate) traffic. GBR is typically used for video and effectively carves out a portion of the bandwidth, regardless if it is being used or not. GBR is necessary for some applications but should be avoided if efficient use of spectrum is a key objective. Categorized traffic types 308, 310, and 312 are funneled into the corresponding LTE bearer 302, 304, and 306 to obtain the necessary QoS. However, multiple applications within one category may have different priorities. For example, when a critical fault detection occurs it has a much higher priority than any other traffic and it may need to preempt all other traffic to get the message through. FIG. 3 illustrates 11 applications 314, each with its unique priority and latency requirements. This cannot be provisioned simply by using LTE bearer settings and if it could, it would be a highly inefficient use of spectrum.

Thus, the systems and methods described herein provide a streamlined and simplified process for adding additional services to the network. These systems and methods include comprehensive edge traffic control and optimization with the ability to deploy additional application functions. These systems and methods can be implemented as part of or in conjunction with a Lifecycle Service Orchestration (LSO) and deployment framework.

Figure 4:
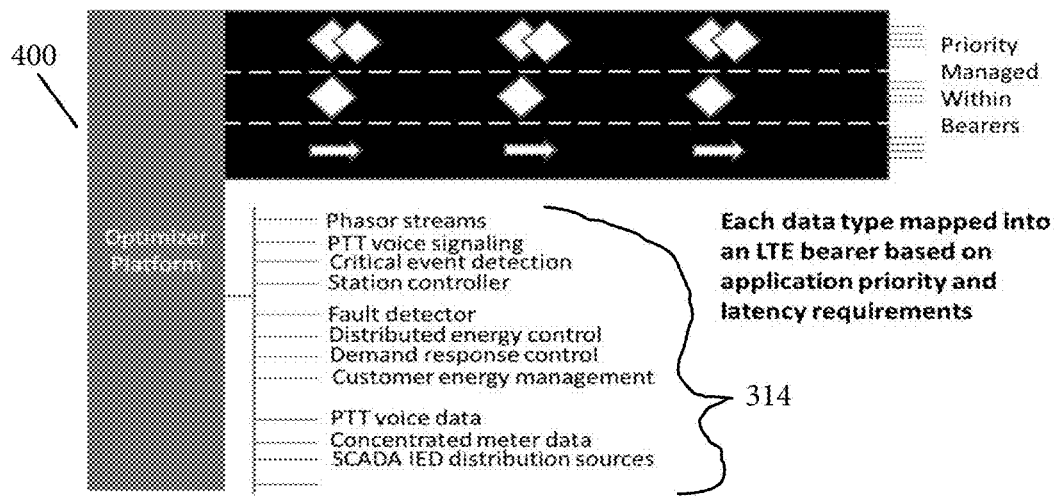
FIG. 4 is a diagram illustrating a network optimizer (NTO) platform for consolidating traffic on appropriate LTE bearers in accordance with one example embodiment.

FIG. 4 is a diagram of an example embodiment of a network optimizer platform 400 configured in accordance with one embodiment to resolve the problems presented above by associating the QoS and latency requirements of an application 314 with one bearer, while being aware of all other applications and their QoS and latency requirements and their bearer association. At the IP layer, the network optimizer can discriminate among application traffic streams and deliver the IP packets to the correct LTE bearer with the appropriate priority at the edge of the network.

Importantly, the network optimizer 400 eliminates the need for the IT network manager to coordinate configuration changes with the LTE network manager. As shown in FIG. 4, the network optimizer 400 can be configured to classify traffic and prioritize it based on the application 314 or traffic type from an application 314. This allows the application 314 to dictate what it needs, which is ideally where the QoS decisions will be made. It can even discriminate on a packet-by-packet basis within one application 314, assuring that critical traffic from an application 314 gets higher priority whereas routine traffic from the same application 314 gets standard priority.

Network Traffic Optimization

Network optimization such as that described includes several considerations.

Compression

The cost of deploying networks with sufficient capacity is directly proportional to the anticipated traffic load. Using lossless data compression to reduce the traffic load becomes an effective capacity multiplier and reduces the cost per bit of the deployment proportionally. Since the Smart Grid data traffic has tremendous packet to packet redundancy, all forms are excellent candidates for over the air compression. Each protocol has a unique packet signature and can be selected and routed to a compression application specific to the protocol. Initial simulations of protocol aware compression indicate more than 60 percent compressibility over non-compressed traffic. Compressed traffic reduces the need to add new eNB sites 108, reduces the cost per bit and allows more applications 314 to run on the network.

Efficient Prioritization of Network Traffic

The next issue to address is traffic priority. With today's access points such as the GE Orbit and the LTE network traffic controls, the way to add new application traffic requires selecting an existing LTE bearer or adding a new one with the appropriate Quality of Service Class Identifier (QCI). At the LTE network level, Policy and Charging Rules Function (PCRF) settings with a new Access Point Name (APN) may need to be issued granting access to that bearer, as well as a unique Quality of Service (QOS) packet indication using Type of Service (TOS) or Differentiated Services (DIFFSERV) packet flags. At the User Equipment (UE) edge device, new traffic routing rules need to be provisioned to get the correct traffic identified and routed into the bearer with the correct Traffic Control (TC) and QOS consistent with the PCRF settings. Coordinating the deployment of a new application requires LTE network engineering, UE routing and QOS configurations, and these need to be done without impacting existing applications 314. This presents additional operations challenges when adding new applications 314 to the network and reduces the operator's flexibility in making traffic priority changes. Moving from network-determined to application-determined priority substantially reduces the complexity and number of elements configured when adding new applications 314. By introducing a comprehensive traffic prioritization and control function to the edges of the network, a few LTE bearers can be configured, and the application traffic within each bearer can be prioritized, independently or in concert with network capacity and traffic demands dynamically. This can be accomplished without resorting to LTE network and edge device reconfiguration.

Improving Network Security and Traffic Prioritization

Traditionally, network transport security has been achieved by preconfigured Point to Point (P2P) and Multipoint VPN tunnels using Transport Layer Security (TLS1.2). TLS 1.2 has security profiles to meet international standards including IEC and IEEE privacy and integrity requirements; however, to steer traffic over a VPN and maintain subnet least privilege access (all entities are assigned just the access required) many tunnels must be provisioned. One tunnel is typically provisioned for each category of traffic, and the tunnels must have two or more endpoints configured with proper security credentials whether Public Key Infrastructure (PKI) or Pre-Shared Keys (PSK) are used. The VPN tunneling features provided by LTE access point vendors are generally compatible when using PKI. Vendors who provide a proprietary PSK management framework may only enable the configuration of a few devices from various vendors. Deploying new devices to the network might work within the key management infrastructure already deployed or may require a separate one.

A more contemporary system for network transport security is achieved using PKI, TLS 1.2, and the HTTPS application protocol, this is the same security mechanism used by web browsers and servers. The HTTPS application protocol enables a wide variety of vendors to interoperate, the PKI requirements are well understood and widely deployed in a vendor neutral way; however, the underlying HTTP protocol standard specification has certain restrictions that prohibit its use as a general-purpose VPN transport. A new version of HTTP, called HTTP/2, greatly enhances HTTP and enables standards-based deployment of VPN connectivity with the required TLS 1.2 security profiles. It also offers new features that greatly increase the efficiency of each connection and enable the prioritization of traffic.

Recently, TLS 1.2 has been technically eclipsed by the TLS 1.3 standard. The new TLS 1.3 standard improves security by enabling the secure profiles of TLS 1.2 but deprecates and prohibits the fall back to less secure profiles previously allowed in TSL 1.2. TLS 1.3 has other important features like 0RTT (Zero Round Trip Time) to first data transmitted. Where TLS 1.2 requires a handshake before data transmission, the 1.3 specification allows data transmission along with the client handshake. This reduction in RTT enables fast connections with early data not available using TLS 1.2; opening the door to new high speed, secure, just in time connectivity for trip and alarm applications. Coupled with HTTP/2, a client application 314 can sense an event, establish a secure tunnel to a protection element, and deliver the event information, as fast as secure VPN technology, without the overhead of pre-established VPN tunnels while meeting all security requirements.

Streamlining the Deployment, Testing and Monitoring of New Applications

LSO framework for deploying, managing and monitoring the network edge compression, security, and priority services enables the deployment of additional value creating applications and services. Building on standards-based cloud deployment framework layers such as OpenStack, OpenDaylight and Kubernetes enables the deployment of additional services, at both the network management layer, as well as the deployed applications 314.

Within existing substations there is an array of single purpose devices from trip detectors and controllers, to SCADA data recorders. These application functions can be integrated into virtual machines at the edge computing node, the same node that provides the network optimization. Going forward, there will be more applications 314 deployed towards the grid edge and those can be integrated with or implemented on platform 400.

Figure 5:
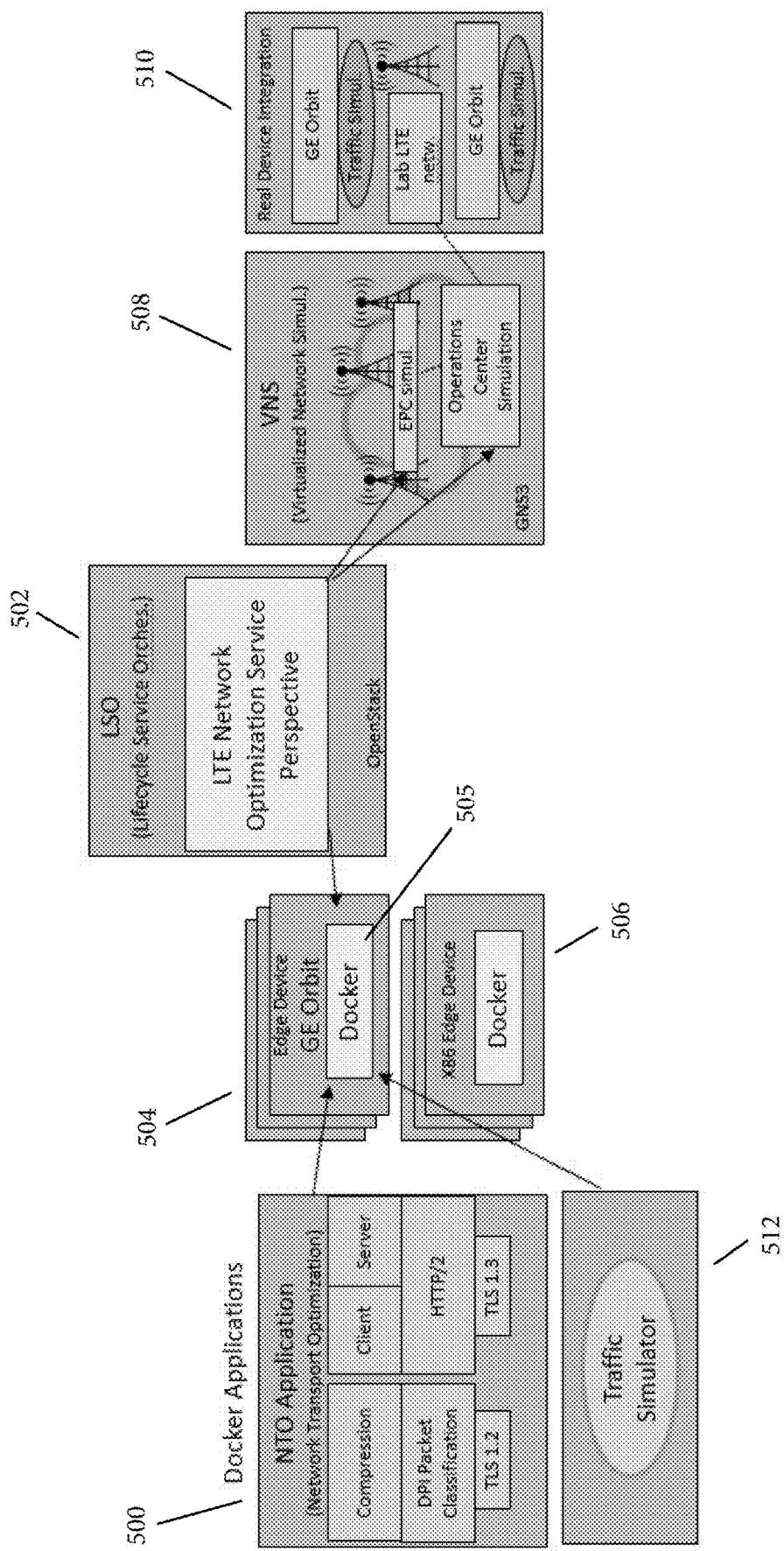
FIG. 5 is a diagram illustrating a comprehensive CII network traffic optimization framework that can include the platform of FIG. 4.

A comprehensive CII network traffic optimization framework can include the three principal framework subsystems illustrated in FIG. 5.

Network Traffic Optimizer (NTO) 400: A SCADA packet classification and lossless data compression and decompression application providing transport security, stream priority, and point to point dynamic routing that is deployable, e.g., on a GE Orbit 504 and x86 CPU hosts 506 as a Docker application 505. Docker is a tool designed to make it easier to create, deploy, and run applications using containers.

Lifecycle Service Orchestration (LSO) 502: A framework subsystem for deploying and configuring the compression and transport application elements, as well as the edge device network configuration.

Virtualized Network Simulation (VNS) 508: A framework subsystem where the above elements can be deployed into a simulation and test environment for QA and product verification of the complete solution. The edge application elements will also be built and tested with specific edge targets such as the GE Orbit 504 and verified with the VNS framework 508. The VNS 508 can be developed with the expectation that it can become the "digital twin" of a deployed CII cell network's traffic profile using the Traffic Simulator (TS) application and provide a valuable function for customers as well.

The subsystems are described in more detail below.

Network Traffic Optimizer (NTO)

The NTO subsystem 400 carries out the following five functions:

Report performance data for all traffic carried between nodes. The nodes will independently report to the LSO 502 in real time each tunnel state, the current performance and traffic carried by each tunnel, the stream within the tunnel, and any backlog of traffic. This performance data will be highly compressed and updated at 10-60 second intervals (~100 bits/sec/tunnel) to the LSO 502. Any traffic anomaly, including loss of reporting, will be quickly identified by rules-based logic, and escalated according to the importance of the impacted applications 314.

Prioritization of traffic, utilizing HTTP2 stream prioritization ensures low latency application traffic is delivered on time over a small set of LTE bearers.

Secure, dynamic VPN tunneling mechanism, utilizing HTTP2/TLS1.3. The tunnels can be quickly established, as needed, while offering configurable stream priorities within the tunnel.

Lossless compression of redundant traffic can be implemented so that network resources are conserved.

A packet classification (DPI-Deep Packet Inspection) layer can also be implemented so that select traffic from the LAN can be forwarded over the tunnel with correct stream prioritization. Traditional tunnels classify traffic by LAN, type, and address information. The NTO's classifier can use these attributes, but by enabling classification by content, further refinement in the backhaul traffic selection and prioritization is achieved.

Lifecycle Service Orchestration (LSO)

The LSO subsystem 502 can be built using existing cloud management tools such as Kubernetes for the deployment of Docker applications, OpenDaylight for the configuration of outer edge networks, as well as the NTO subsystem 400. OpenStack integrates both OpenDaylight and Kubernetes so that a deployment scenario can be defined and executed in a systematic way for many nodes. The coordination of edge device configuration and the NTO 400 configuration must align with the LTE network PCRF settings—misalignment can cause a catastrophic outcome. Rule-based logic must be developed to ensure the trouble-free deployment of services.

Today this alignment coordination is done by domain experts with knowledge of the LTE network, the specific application traffic requirements, as well as the edge device performance and configuration capabilities. The actual configurations must be determined and carefully entered manually into various subsystems, e.g., LTE APNs, PCRF, edge router access point, VPN concentrator, and firewalls. This presents the opportunity for values to be manually entered incorrectly. Therefore, extensive follow up auditing and testing must be done to ensure the smallest change cannot inadvertently or intentionally destabilize the network, and adversely impact the operator's ability to fully utilize their network.

Because the NTO 400 harmonizes the traffic over 3-4 deployed bearers and uses HTTPS/2 traffic to well defined application ports, the LTE PCRF, edge router configuration, and firewalls can be statically configured. The only configuration needed is defining a traffic path between NTO 400 nodes within the NTO 400 application space. This vastly simplifies the network re-configuration. With the NTO 400, new traffic patterns can be consistently deployed through the LSO 502 automation subsystem without reconfiguration of the LTE network, edge devices, and firewalls.

Virtual Network Simulator (VNS)

The development of the NTO 400 and LSO 502 subsystems will require a test environment, one where various NTO 400 configurations can be deployed, tested with simulated traffic, retired, upgraded, and redeployed again. Such a test framework could be useful for LTE network operators as well.

Without a framework, new applications 314 can be deployed to one cell at a time, with each phase of deployment evolution carefully tested at small scale, then again at a bit larger scale, and finally a full scale. These iterations of deployment fit well with the current manual deployment practices, iterations from small to large help refine Methods of Procedure (MOP), uncover unexpected errors. Each evolution of the deployment exercises a large team of external vendors, network operations and QA workers. With a VNS offering "digital twin" capability, the operator would use the VNS 508 to simulate deployment to various cell configurations, iteratively as before, but instead of possibly impacting the production network, refinements and adjustments could be made in the virtual environment. Finally, when the deployment of the new application works in the VNS 508, it can be deployed to the production network with far fewer resources, and greater confidence of success.

The VNS 508 can also host Cyber-Security adversarial test scenarios, these scenarios can be evaluated in the virtual environment, and mitigation to various new threats could be rapidly and repeatedly tested to ensure new and existing applications 314 are threat hardened. Developing such an environment could be done in concert with regulatory requirements to facilitate threat evaluation and mitigations are properly in place. OpenStack work flows can ensure that complete threat testing is performed before deployment to production networks.

NTO (Network Traffic Optimizer)

Figure 6:
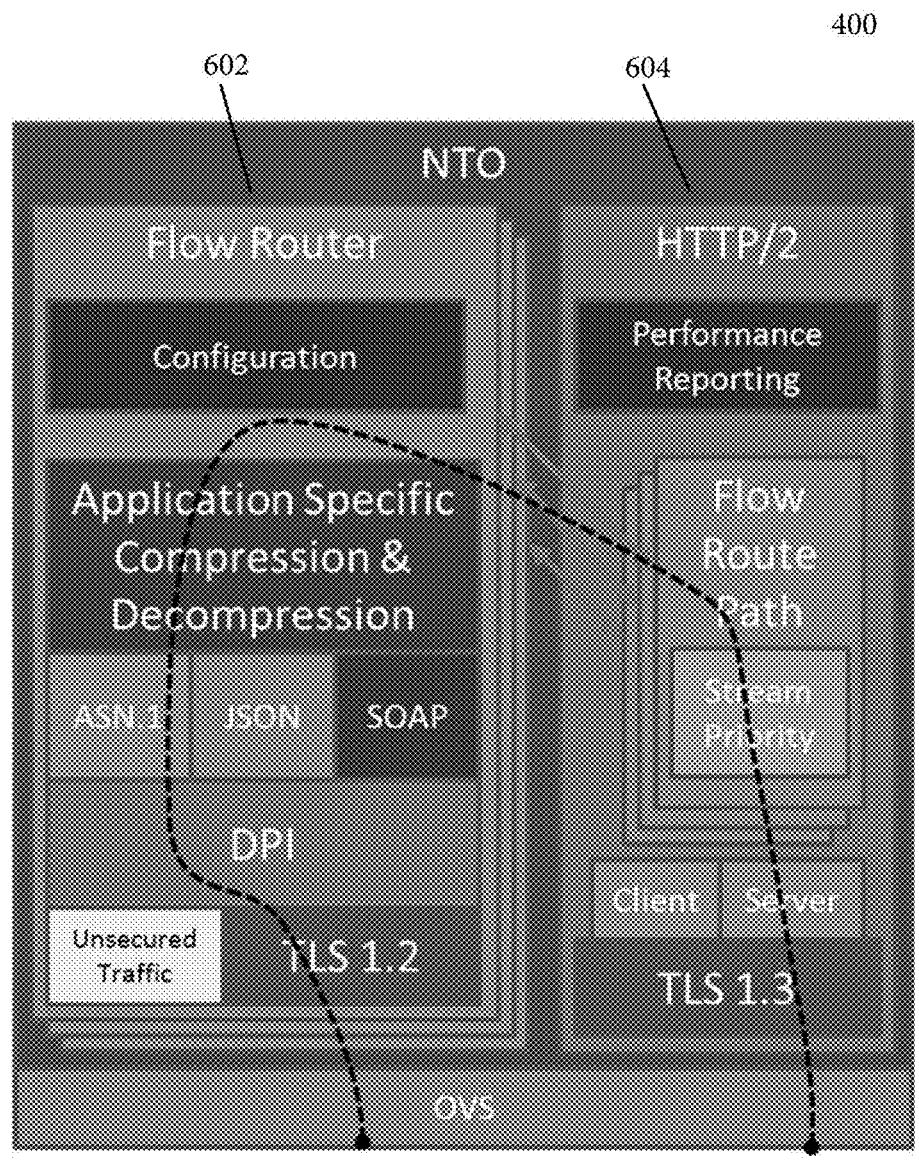
FIG. 6 is a diagram illustrating an example NTO platform in more detail.

FIG. 6 is a diagram illustrating an NTO 400 in accordance with one embodiment. The NTO 400 block diagram shows a PPP (Packet Processing Paths) associated with an IEC Smart Grid Protocol. Within the Flow Router 602, Smart Grid protocols define encryption and authentication typically TLS 1.2, and packet payload data formats such as ASN.1, JSON, SOAP, and possibly CoAP to name a few. The DPI function identifies traffic by five-tuple (source IP, source port, destination IP, destination port, and protocol) as well as packet contents. The Application Specific Compression block contains logic for lossless compression of redundant information. The HTTP/2 block 604 depicts the protocol flows being assigned a stream priority with the data flowing towards a remote destination utilizing TLS 1.3 encryption.

HTTP/2 604 Features

Stream Prioritization

Because an HTTP/2 message can be split into many individual frames, and frames from multiple streams to be multiplexed, the order in which the frames are interleaved and delivered both by the client and server becomes a critical performance consideration. To facilitate this, the HTTP/2 standard allows each stream to have an associated weight and dependency: Each stream may be assigned an integer weight between 1 and 256. Each stream may be given an explicit dependency on another stream.

HEADERS frame: As its name implies, this type of frame carries HTTP headers. When sent by the browser to the server, it signals that a request is being made. When sent by the server to the browser, it signals that a response to a previous request or push promise is being sent.

PUSH_PROMISE frame: This frame is sent by the server to the browser to start pushing a resource. It also contains HTTP headers. However, the kind of headers present in a PUSH_PROMISE frame are headers that would normally be present in a request. This is different from the response headers that a server would normally send. The request URL, for example, is present in the PUSH_PROMISE frame as the HTTP/2-specific: path pseudo-header, as is the :authority pseudo-header to indicate a host. Other headers that may be present in a PUSH_PROMISE and that some browsers use cache headers, for example, if-nonematch.

DATA frames: These frames are sent in either direction to carry the actual content of a resource or the contents that the browser POSTs or PUTs to the server.

RST_STREAM frames: These frames serve many purposes. One of them is having the browser signal to the server that a pushed stream is not needed.

The combination of stream dependencies and weights allows the client to construct and communicate a "prioritization tree" that expresses how it would prefer to receive responses. In turn, the server can use this information to prioritize stream processing by controlling the allocation of CPU, memory, and other resources, and once the response data is available, allocation of bandwidth to ensure optimal delivery of high-priority responses to the client.

A stream dependency within HTTP/2 604 is declared by referencing the unique identifier of another stream as its parent; if the identifier is omitted the stream is said to be dependent on the "root stream". Declaring a stream dependency indicates that, if possible, the parent stream should be allocated resources ahead of its dependencies. In other words, "Please process and deliver response D before response C".

Figure 7:
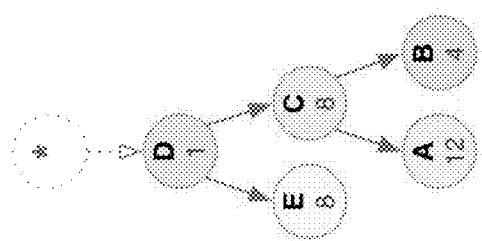
FIG. 7 is a diagram illustrating examples for how the NTO of FIGS. 4 and 6 can allocate bandwidth on a shared bearer between multiple data streams.
Figure 7:
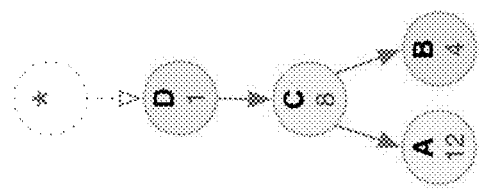
Figure 7:
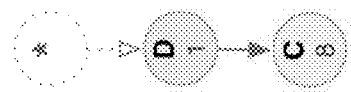
Figure 7:
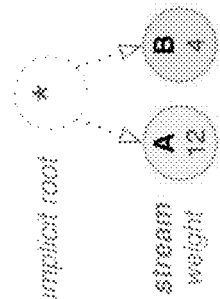

Streams that share the same parent (in other words, sibling streams) should be allocated resources in proportion to their weight. For example, if stream A has a weight of 12 and its one sibling B has a weight of 4, as illustrated in FIG. 7, then to determine the proportion of the resources that each of these streams should receive:

Sum all the weights: 4+12=16; and

Divide each stream weight by the total weight: A=12/16, B=4/16.

Thus, stream A should receive three-quarters and stream B should receive one-quarter of available resources; and stream B should receive one-third of the resources allocated to stream A.

FIG. 7 illustrates a few more examples. From left to right: Neither stream A nor B specifies a parent dependency and are said to be dependent on the implicit "root stream"; A has a weight of 12, and B has a weight of 4. Thus, based on proportional weights: stream B should receive one third of the resources allocated to stream A. Stream D is dependent on the root stream; C is dependent on D. Thus, D should receive full allocation of resources ahead of C. The weights are inconsequential because C's dependency communicates a stronger preference. Stream D should receive full allocation of resources ahead of C; C should receive full allocation of resources ahead of A and B; stream B should receive one-third of the resources allocated to stream A. Stream D should receive full allocation of resources ahead of E and C; E and C should receive equal allocation ahead of A and B; A and B should receive proportional allocation based on their weights.

As the above examples illustrate, the combination of stream dependencies and weights provides an expressive language for resource prioritization, which is a critical feature for improving browsing performance where we have many resource types with different dependencies and weights. Even better, the HTTP/2 604 protocol also allows the client to update these preferences at any point, which enables further optimizations in the browser. In other words, we can change dependencies and reallocate weights in response to user interaction and other signals.

Server push allows an HTTP/2-compliant server to send resources to a HTTP/2-compliant client before the client requests them. It is, for the most part, a performance technique that can be helpful in loading resources preemptively. With HTTP/2 Push, the server can take the initiative by having rules that trigger content to be sent even before it is requested. For example, request of an info.html file can trigger the delivery of several other files a client would need to process the info.html file. This reduces the request overhead and utilizes the independent streams facility of HTTP/2 https://en.wikipedia.org/wiki/HTTP/2_Server_Push The nghttp2 library is the primary candidate to provide HTTP/2 client server stream prioritization and VPN encapsulation. The library is licensed with a MIT License, a short, permissive software license, allowing you to do whatever you want so long as you include the original copyright and license notice in any copy of the software/source.

With TLS1.3 strong, interoperable, standards-based end-to-end security is achieved. Thus, certain embodiments can provide:

Perfect Forward Secrecy;

No proprietary hardware or software;

Strong crypto suites with no fall back to weak crypto;

No proprietary encapsulations;

Large eco-system of interoperable web-scale security infrastructure exists now; and 0-RTT Client-Server data transfer.

Figure 8:
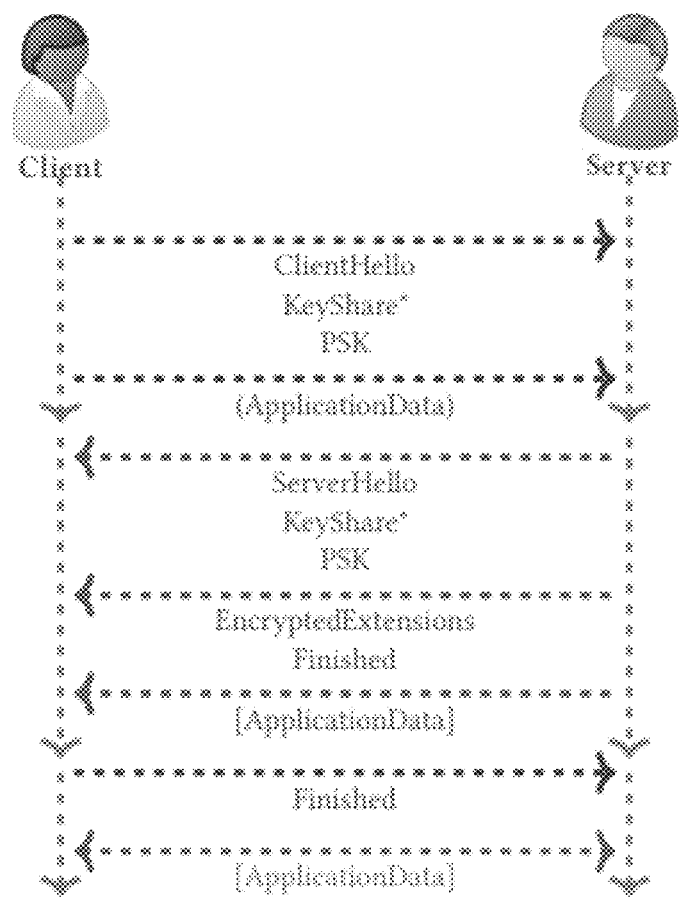
FIG. 8 is a diagram illustrating the TLS 1.3 0-RTT client server data transfer protocol.

FIG. 8 illustrates the TLS 1.3 0-RTT client server data transfer protocol. The OpenSSL 1.1.1 release includes support for TLSv1.2 and 1.3 and is the primary library candidate for securing TCP/IP connections. OpenSSL is release under an Apache style license requiring acknowledgements if redistributed.

The NTO 400 can be configured by a cryptography signed and encrypted JCF (JSON Configuration File) deployed within the Docker container 505 of the NTO 400. The JCF can contain the configurations for the Packet Processing Paths defining exactly what traffic is picked out of the LAN, decrypted, compressed, prioritized, and sent to a remote endpoint and what is received by the endpoint and sent to the LAN. Upon receipt by the endpoint the original packet data is recovered by de-compression, and the packet is forwarded into the endpoint LAN network. The NTO 400 configuration will be managed by an OpenStack add-on Web Portal.

Performance Reporting from each NTO 400 instance to the LOS 502 Performance Management Console can use JSON UPDATE messages with gzip encoding to reduce traffic. The reported parameters will include:

Active connection inventory;

Active stream per connection;

Per stream packet backlog;

Per stream compression performance; and

Connection performance (throughput, packet loss, jitter, latency).

Figure 9:
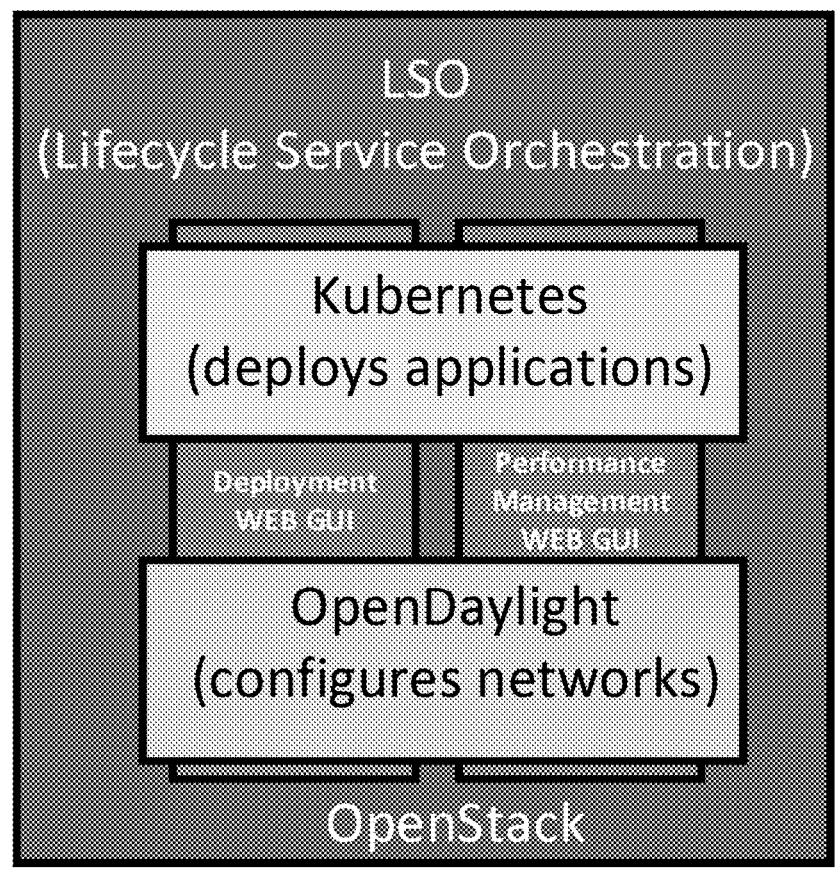
FIG. 9 is a diagram illustrating an example embodiment of an Lifecycle Service Orchestration (LSO) that can be included in the platform of FIG. 5.

FIG. 9 is a diagram illustrating an example embodiment of an LSO 502. The Service Perspective Web Based Portal provides the comprehensive portal for on-boarding of edge resources into inventory, verification of edge resource configuration, deployment of container instances, instance activation, monitoring performance, re-configuring and retiring instances to either a virtual twin network, or the actual production network. The Deployment WEB GUI is used to configure, unit test, and deploy the NTO 400 function to the MEC (Multi-access edge computing) endpoints using the OpenStack IaaS (Infrastructure as a Service) abstraction framework. The Performance Management WEB GUI is used to monitor status of the NTO 400 services.

Multi-Access Edge Computing

Multi-access edge computing (MEC) is an IT service environment for the edge of the network such as an access point supporting Docker, or a VM host running in a cloud or LAN. MEC is a network architecture that brings real-time, high-bandwidth, low-latency access to radio network information, allowing operators to enhance their networks with a new ecosystem of functions and value chain. MEC permits multiple types of access and processing at the edge, including LTE and wireline.

OpenStack Horizon

OpenStack Horizon is the web-based interface for all Open Stack Services, Security Groups, and complex cluster configurations; it has more depth and scale of control than necessary for deploying the NTO 400 function. Further definition and refinement of the LSO functions will be done after proof of concept.

OpenStack Keystone

OpenStack Keystone is the identity service, that manages security within the OpenStack framework, all OpenStack functions use Keystone for authentication, service discovery, and distributed multi-tenant authorization. Using OpenStack Keystone will allow segregation of NTO flows so that AMI traffic flows can be managed apart from substation GOOSE, and DER data traffic, enabling a multi-tenant network to be established within the NTO network.

OpenStack Neutron

OpenStack Neutron is the modular networking service to manage networking as a service within the OpenStack framework. There is a server component running centrally, and distributed service components running at compute and network nodes. The Neutron API server supports OpenStack Horizon dashboard and HTTP RESTful APIs, to perform CRUD (Create, Read, Update, Delete) operations on various network resources. The Neutron's ML2 interface support OvS (Open Virtual Switch), and Linux Bridge, as well as other networking gear.

Figure 10:
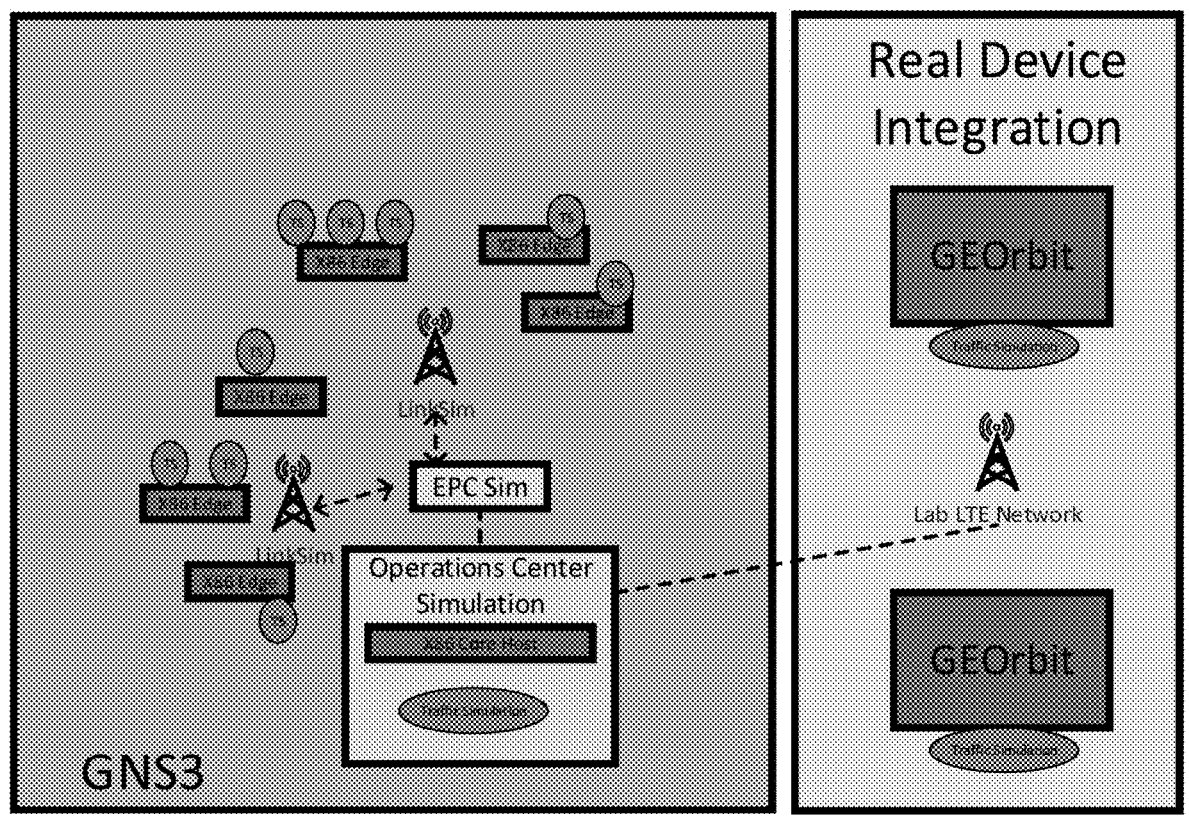
FIG. 10 is a diagram illustrating an example embodiment of an Virtualized Network Simulation (VNS) that can be included in the platform of FIG. 5.

FIG. 10 is a diagram illustrating an example embodiment of an VNS 508. The VNS 508 can extensively use the GNS3 (Gnu Network Simulator 3) environment for supporting a "digital twin" framework. GNS3 can host a virtualized network and MEC endpoints, as well as integrating to real networks with real hardware attached. With this environment the interworking of the LSO 502, NTO 400 applications and simulated LTE network can be evaluated, the user interfaces refined and the product matured. This environment will begin with a simplified LTE network core abstraction, as a simple L2 switch. As the product matures the network capacity of a real LTE network can be modeled, and finally the actual LTE components (UE interface, eNB and EPC) can be virtualized to provide the most realistic modeling of the LTE including: AMC, scheduling, network coverage, and overall system performance. Initially we will use the existing network simulation functions supported by GNS3 plug-ins such as link capacity, BER (Bit Error Rate), PER (Packet Error Rate), latency and jitter to approximate network behaviors.

Real Device Integration

Because GNS3 is a network simulator it can incorporate connections to real networks, with real devices connected. As depicted in FIG. 10, external gear such as a Lab LTE network and GE Orbits can be exercised along with virtual nodes running within GNS3.

Computer-Implemented Embodiment

Figure 11:
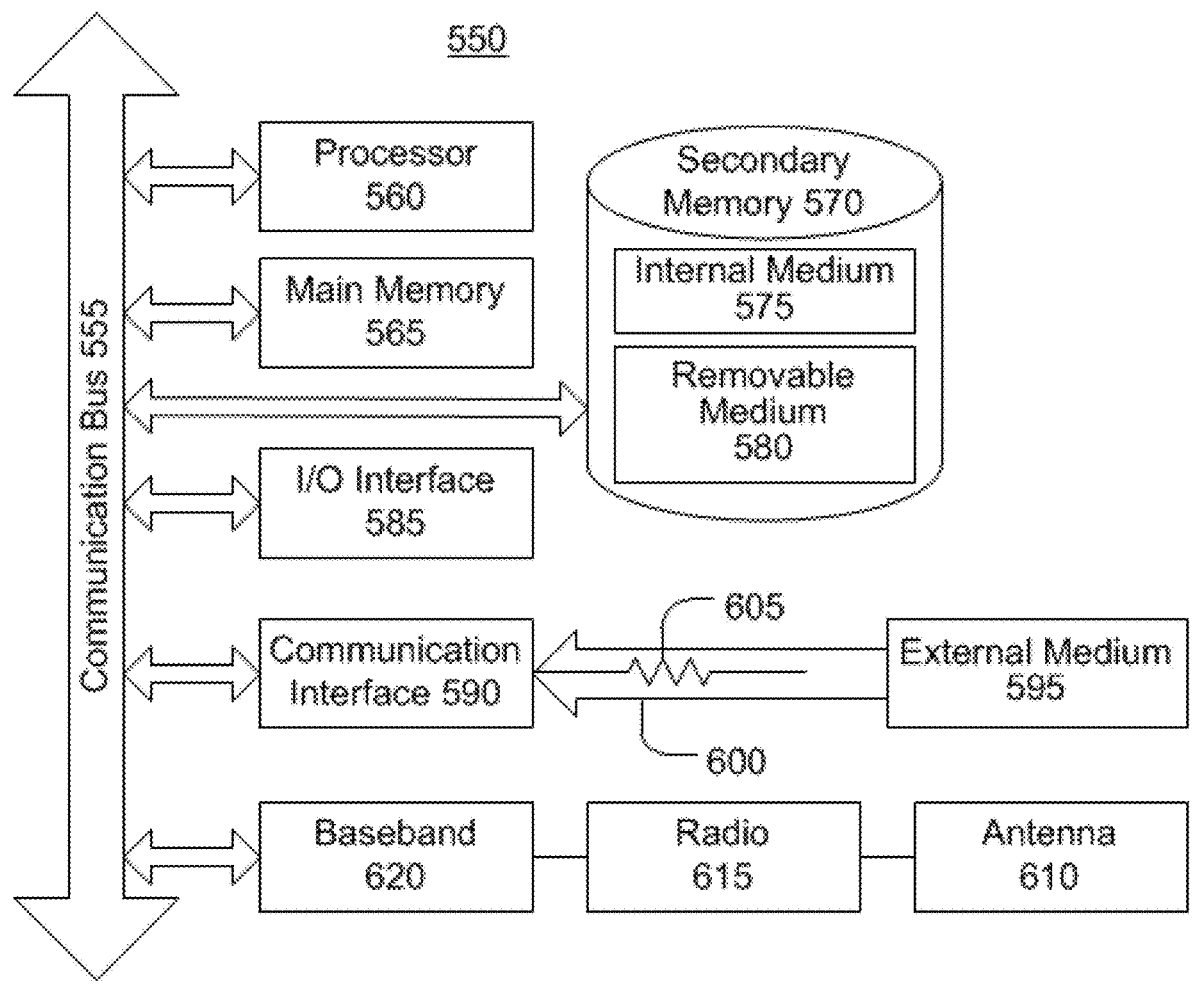
FIG. 11 is a block diagram illustrating an example wired or wireless system that may be used in connection with various embodiments described herein

FIG. 11 is a block diagram illustrating an example wired or wireless system 550 that may be used in connection with various embodiments described herein. For example, the system 550 may be used as or in conjunction with a framework 500, NTO 400, LSO 502 or VNS 508 as previously described with respect to 3-10. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random-access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example, the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570 or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method of optimizing IP data transmission from source(s) to destination(s) over networks comprising:
   classifying, at a source, discrete packets included in IP traffic from multiple applications by five tuple and packet content;
   create independent streams of traffic, each independent stream of traffic comprising discrete packets from different applications using the classifications related thereto;
   prioritize each stream;
   assigning each independent stream to a TCP connection of a plurality of shared TCP connections based on the classification of the discrete packets and prioritization associated with each independent stream;
   compressing each stream within the shared TCP connections;
   transmission rate limiting of each independent stream within the shared TCP connections; and
   routing the independent streams to a destination via the shared TCP connections.

2. The method of claim 1, further comprising: associating each of the plurality of TCP connections to an LTE bearer using TOS or DS packet indications.

3. The method of claim 1, where the source terminates packets classified as TCP, using a TCP stack operation, and the destination initiates a TCP stack operation for the transmission of packets to the destination.

4. The method of claim 1, where source traffic identified as IEC-61850 is losslessly compressed by the transformation of the packet contents to a JSON document, and differences between subsequent packets is indicated using the JSON UPDATE function, and the resulting UPDATE documents are gziped.

5. The method of claim 1, where the stream prioritization has 256 levels within each TCP connection.

6. The method of claim 1, where each TCP connection is encrypted using TLS1.3.

7. The method of claim 1, where the TCP connections between the source and destination are pre-established, or are initiated with the identification of traffic.

8. The method of claim 1, where the source and destination report status to a network performance monitor to report compression efficiency, packet backlog, and other network performance factors.

9. The method of claim 1, further comprising buffering unsent packet backlog between the source and destination.

10. The method of claim 1, further comprising the destination receiving such TCP connections, expanding the discrete packets from each independent stream.

* * * * *